United States Patent [19]

Borden

[11] Patent Number: 4,813,917
[45] Date of Patent: Mar. 21, 1989

[54] DRIVE ASSEMBLY

[76] Inventor: William Borden, Guanaja., Bay Island, Honduras

[21] Appl. No.: 133,818

[22] Filed: Dec. 14, 1987

[51] Int. Cl.[4] ............................................. F16H 55/02
[52] U.S. Cl. ........................................ 474/160; 474/84
[58] Field of Search ...................... 474/69, 70, 84–89, 474/160; 180/72; 280/250, 259, 260, 261

[56] References Cited

U.S. PATENT DOCUMENTS 1,304,450  5/1919  Bublitz .............................. 474/84 X
4,705,493  11/1987  Lin ..................................... 474/88 X Primary Examiner—Thuy M. Bui
Attorney, Agent, or Firm—John Cyril Malloy

[57] ABSTRACT

A drive assembly for a powered mechanism initially demonstrated in the form of a bicycle type vehicle wherein the drive assembly is manually powered and comprises a gear assembly including a plurality of gear pairs. Each gear of each gear pair is connected to either a drive shaft or a driven axle and the various gears of the plurality of gear pairs are specifically sized and drivingly interconnected to one another so as to maximize efficiency in operation and provide a smooth transmission of power from the drive shaft to the driven axle. Energy in the form of a pulling force is retransmitted back to the drive shaft to render the subject drive assembly more efficient and require less manual exertion and manpower delivered into the system of the drive assembly to maintain the vehicle or other mechanism being driven in operation.

13 Claims, 2 Drawing Sheets

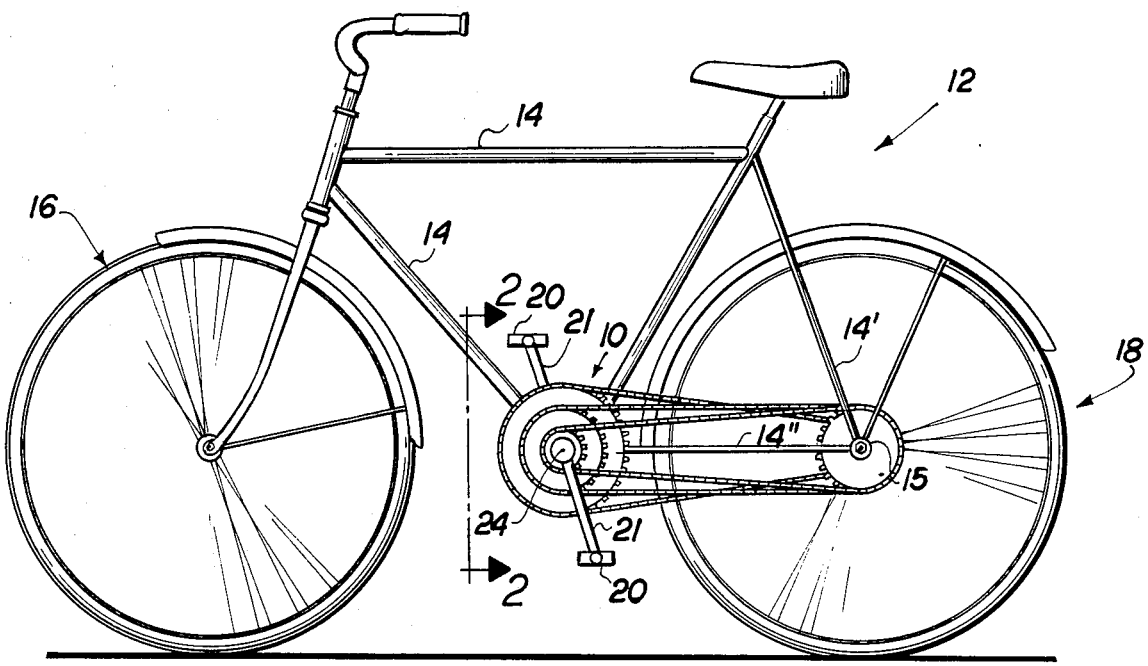
FIG. 1
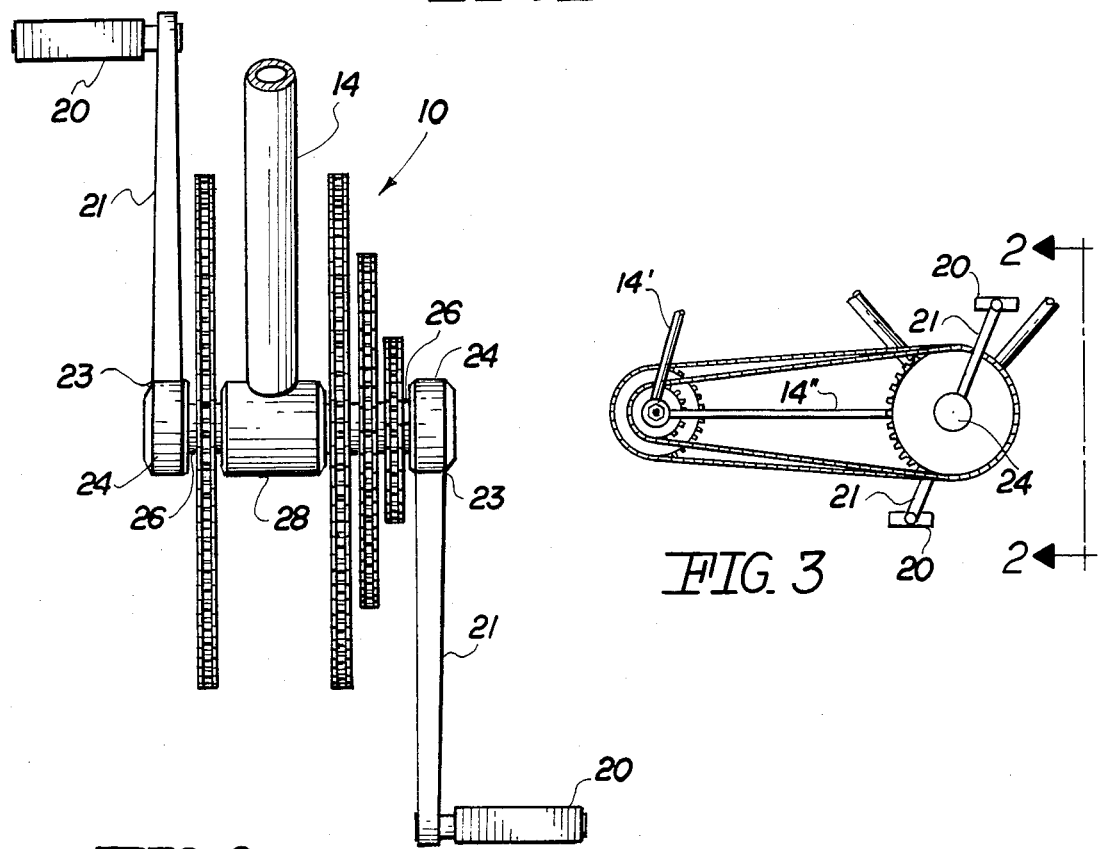
FIG. 2
FIG. 3

DRIVE ASSEMBLY

BACKGROUND OF THE INVENTION

1. Field of the Invention

This invention relates to a drive assembly which may initially be manually powered and which is adaptable to a bicycle type vehicle or other mechanisms whether or not manually powered and further wherein the drive assembly comprises a gear assembly comprising a plurality of gear pairs drivingly interconnected and specifically sized to maximize the out-put of the drive assembly.

2. Description of the Prior Art

Typically, cycle type vehicles such as a bicycle, which are manually powered, involve pedals turning a drive shaft in a typical and well accepted fashion. At least one drive gear or sprocket is fixedly secured to the drive shaft to rotate therewith when the operator applies manual force in the form of pedaling. This main drive gear or sprocket is connected by a sprocket chain or like device to a driven gear or sprocket secured to a drive axle normally attached to the rear wheel of the bicycle. Rotation of the drive shaft and the drive sprocket secured thereto causes rotation of the driven axle of the rear wheel and rotation thereof. During power is thereby supplied to the vehicle.

A more sophisticated drive assembly associated with bicycle-type vehicles as well as other manually powered devices include a drive assembly having a "gear changing" ability. In such a construction, a sprocket chain is transferable between each of a plurality of drive gears or sprockets attached to the drive shaft in spaced but generally immediately adjacent relation to one another. These drive sprockets are of a different size and accordingly rotation through the application of manual pedaling power of the drive shaft will cause each of the drive sprockets thereon to rotate at the same speed. However, due to the variance in the size of such a plurality of drive sprockets the rear driven axle to which the rear wheel is attached may rotate at varying speeds depending upon the transfer or placement of the interconnecting sprocket chain on a particular one of the plurality of drive sprockets. Assuming that the driven sprocket on the driven axle attached to the rear or power wheel of the bicycle is a first given size, the driven axle will be rotated at a greater speed when the interconnecting sprocket chain is driven by a larger diameter drive sprocket or gear than when the sprocket chain is attached to a smaller diameter drive sprocket or gear. Changing or the gears manually by the operator has its obvious advantages and such a drive assembly has enjoyed great popularity in recent years as evidenced by the consumer demand for performance bicycles commonly referred to as "ten speeds" or "three speeds".

While the above set forth prior art drive assemblies, particularly associated with bicycles, are operative and well accepted for their intended function. They are primarily designed to increase the operative performance in terms of speed characteristics and ease of pedaling of the cycle.

There is still a demand in the cycling art for a drive assembly which takes advantage of certain "lost energy" delivered to the drive axle of the vehicle such as when the operator is "coasting" after reaching a certain intended or predetermined speed.

SUMMARY OF THE INVENTION

The present invention is directed to a drive assembly which may be adapted to a number of environments but which is specifically explained hereinafter with reference to application on a manually powered bicycle type vehicle. It should be recognized that the drive assembly of the present invention is not limited to manually powered mechanisms but could be used in theory in systems of much larger capacity such as a hydro-electric plant, a turbine drive mechanism or a more modest application such as wind mills wherein winds would be the prime mover. An important feature of the present invention is a device which takes advantage of certain "lost energy" after the mechanism, for which the subject drive assembly is adapted, reaches a certain momentum.

Again, with more specific explanation regarding a cycle type vehicle application, once the vehicle reaches a certain speed or momentum and the operator stops applying manual force, through pedaling, the drive assembly of the present invention transfers certain energy inherent in the vehicle, due to its build-up of momentum when traveling at certain speeds, back to a drive shaft associated with the subject drive assembly. Through proper gearing assemblies travel or operation of the vehicle at increased efficiencies and for a prolonged period of time is maintained.

More specifically, the drive assembly of the present invention comprises a gear assembly mounted on both a primary drive shaft, to which operator activating means in the form of pedals are attached; and a rear driven axle to which the rear or power wheel is attached. The gear assembly defining the drive assembly of the present invention comprises a plurality of gear pairs each including a drive gear and a driven gear. In an operative, preferred embodiment to be described in greater detail hereinafter, the plurality of gear pairs includes a first, second and third gear pair each including a drive gear and a driven gear. The drive gears of the first and second gear pair are of a same size and significantly larger, in the ratio of approximately two to one, than the driven gear. The drive gears are attached by ratchet means to the drive shaft and interconnected to the driven gears, mounted to rotate with the driven axle by a sprocket chain or like interconnecting structure.

The gears of the individual gear pair may be referred to as sprocket gears or sprockets. This is due to the fact that the particular application for which the subject drive assembly is explained relates to a bicycle type vehicle. Accordingly, the aforementioned interconnecting member or sprocket chain travels continuously about the peripheries of both the drive gear and the driven gear of each gear pair. The forced rotation of the drive shaft due to the pedaling if the operator in turn causes the forced rotation of the driven axle and the power wheel attached thereto due to the resulting interconnecting member extending between the drive gear and the driven gear as will be explained in greater detail hereinafter.

An important feature of the present invention is the existence of at least a third gear pair differing from the first and second gear pair in that the drive sprocket or gear is mounted on the driven axle so as to rotate therewith. This drive gear is larger than the driven gear associated with the third gear pair. The driven gear in turn is mounted on the drive shaft to rotate therewith and in effect is sized in cooperation with the drive gear of the third gear pair and interconnected therewith by a similar sprocket chain or like interconnecting member such that a pulling force is exerted on the drive shaft once the vehicle reaches a certain momentum and the operator stops pedaling or forcing the forward forced rotation of the drive shaft. Ratchet means associated with each of the gears attached to the drive shaft as well as the pedals attached to the drive shaft may cause idling or free-wheeling of certain ones thereof while the driven axle continues to rotate due to the momentum and continued forward motion of the vehicle, even though the operator is not pedaling. This momentum and the energy resulting from the continued forward motion of the bicycle is transferred back to the drive shaft since the drive sprocket of the third gear pair is attached to the driven axle and is continually rotated therewith. The interconnecting sprocket chain in turn forces the driven sprocket gear attached to the drive shaft of the third gear pair to cause or aid in its continued forward rotation. This forward rotation is again reciprocally channeled back to the driven axle through the rotation of the drive shaft and at least one of the drive sprocket gears of the first or second gear pair.

Accordingly, at least some of the energy, normally lost when the bicycle type vehicle continues to travel due to a build-up of momentum, is transferred back to the drive shaft and in-turn retransmitted smoothly back to the driven axle. Energy previously lost is therefore at least partially recaptured and the forward travel of the vehicle continues for a prolonged period of time thereby increasing the overall efficiency of the subject drive assembly.

The invention accordingly comprises the features of construction, a combination of elements, an arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is a side plan view of a cycle-type vehicle or bicycle incorporating the drive assembly of the present invention.

FIG. 2 is a front sectional view in partial cut-away along line 2—2 of FIG. 1 showing structural features of the drive assembly and a drive shaft on which it is mounted.

FIG. 3 is a detailed view of the opposite side of the drive assembly in partial cut-away over that shown in FIG. 1.

Like reference numerals refer to like parts throughout the several views of the drawings.

DETAILED DESCRIPTION OF THE PREFERRED EMBODIMENT

Figure 4:
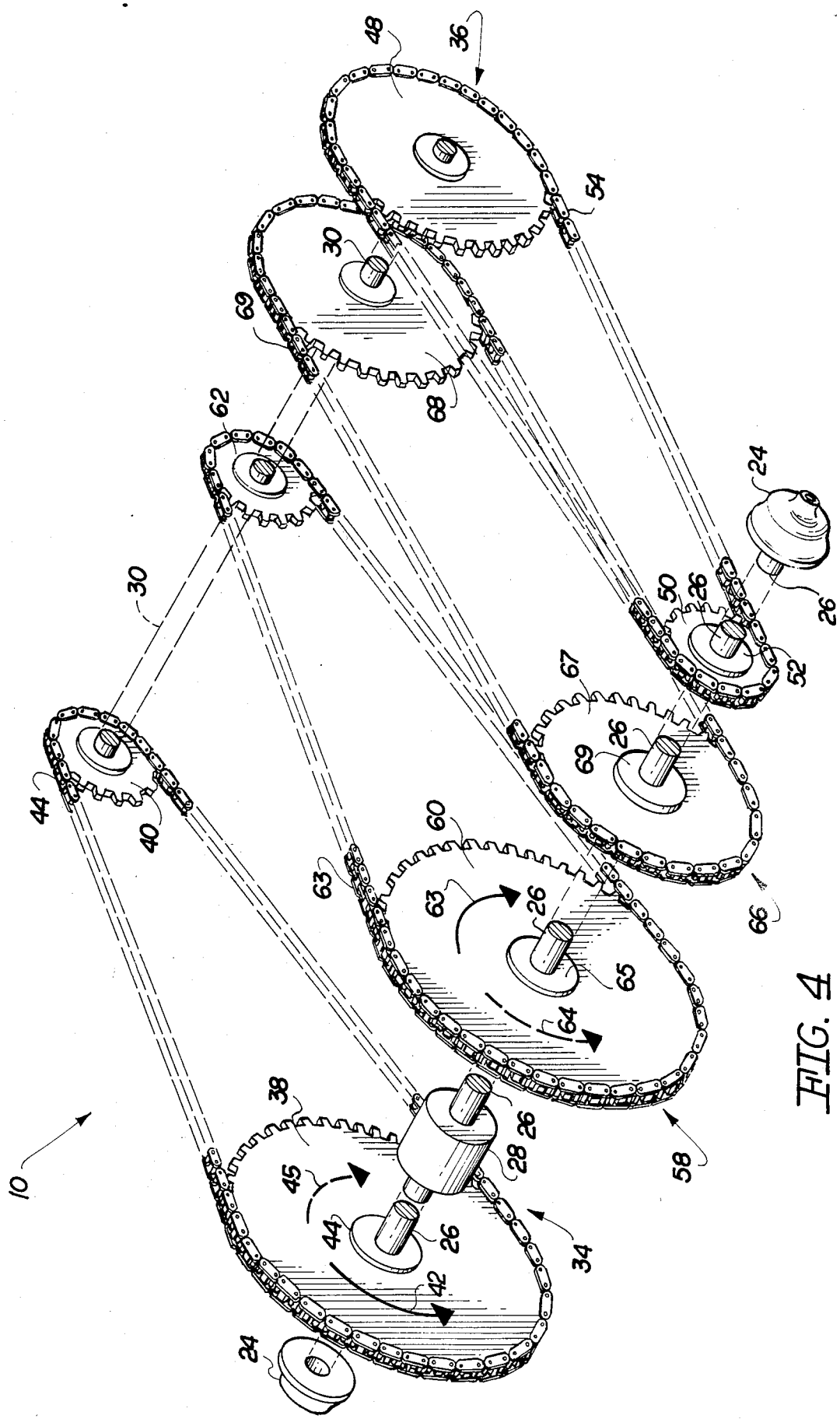
FIG. 4 is a perspective view in partial cut-away and phantom showing the gear assembly associated with the drive assembly of the present invention.

As shown in FIGS. 1 through 4, the present invention is directed towards a drive assembly generally indicated as 10 and being adaptable to a variety of specific applications. As shown in FIG. 1 the application with which the drive assembly 10 will hereinafter be described, relates to a bicycle or like vehicle generally indicated as 12. However, it should be emphasized that the drive assembly 10 of the present invention can be modified to be adaptable for operative use in a variety of other widely variant applications.

For purposes of explanation, the cycle vehicle 12 includes, except for the drive assembly 10, a standard design or construction including support frame 14 and at least one front wheel 16 and a rear power or drive wheel 18. A standard foot-operated pedal assembly is associated with the gear assembly 10 and is the main means of "powering" the drive assembly 10. The pedal assembly includes oppositely disposed spaced-apart foot pedals 20 each connected to a distal end of a elongated shaft 21 wherein the proximal end of each shaft 21 is connected as at 23 by any standard and convenient means to preferably a ratchet structure 24. The ratchet structures 24 are each disposed at opposite ends to a main drive shaft 26. Each of the ratchets 24 are structured, in a preferred embodiment, to cause forced "forward" rotation of the drive shaft 26 when pedaling of the pedals and associated shafts 20 and 21 respectively by the feet of the operator is accomplished. However, the structure of the ratchets 24 is such that forward rotation of the drive shaft 26 is still allowed when pedaling stops by the operator such as in a coasting mode after the vehicle has reached a certain speed or momentum and coasting is desirable. An enclosed bearing assembly 28 is secured to the drive shaft 26 (see FIG. 4) and serves to interconnect the portion of the support frame 14 to the drive shaft such that the drive shaft 26 is allowed to rotate. The bearing structure 28 may be of any conventional and well-known commercially available design structure capable of allowing rotation of the shaft 26 in the manner prescribed.

With regard to FIGS. 1, 3 and 4, the vehicle 12 as well as the gear assembly 10 of the present invention further includes a driven axle 30 connected to the central hub of the rear, driven wheel 18 such that the wheel and driven axle 30 rotate together. Conventional interconnection, while not being specifically shown in the figures herein, may be accomplished by interconnecting a portion of the support frame as at 14' to the driven axle 30 such that the driven axle and drive wheel 18 are allowed to rotate relative to the remainder of the support frame 14 or 14' but the support frame is of course allowed to be supported thereon. This type of interconnection as at 15, may take any of a variety of well-known or conventional mechanical structure and for purposes of clarity is not specifically shown herein. Also, an additional brace portion 14" may be included as part of the support frame 14 and serves to maintain a fixed, spaced apart relation between the drive shaft 26 and the driven axle 30 and is provided for purposes of stability.

With primary reference to FIGS. 2 and 4, the drive assembly 10 of the present invention comprises a gear assembly in the form of a plurality of gears. FIG. 4 represents a composite embodiment wherein in a preferred embodiment less than all the gear pairs shown, will in fact be utilized and applied in actual application to a cycle-type vehicle 12. Accordingly, a preferred embodiment of the present invention includes at least a first gear pair 34 and a second gear pair 36 each comprising two gears one of which is mounted on the drive shaft 26 and one being mounted on the driven axle 30. More specifically, the first gear pair 34 includes a first drive gear 38 and a first driven gear 40. The first drive gear or drive sprocket gear 38 is attached to rotate with the drive shaft 26 in a positive forward direction as indicated by the solid directional arrow 42. However, interconnection between the gear 38 and the drive shaft 26 is accomplished by means of an independent ratchet structure 44 which is specifically constructed to allow the gear to free-wheel relative to the drive shaft 26 when coasting or when it is attempted, through reverse pedaling, to rotate the drive shaft 26 in a reverse direction as indicated by the directional arrow 45 in phantom lines. The first drive gear 38 is drivingly interconnected to the first driven gear 40 by an interconnecting member 46 preferably in the form of a sprocket chain or the like. The sprocket chain is constructed to matingly engage the plurality of gear teeth integrally formed about the periphery of each of the first drive gear 38 and first driven gear 40. Further, it should be noted that the first drive gear 38 is larger than the first driven gear 40 preferably in a ratio of at least two to one. Due to this size ratio, certain mechanical advantage will be provided upon the forced manual rotation of the drive shaft 26, due to pedaling of the bicycle. The driven axle 30 will rotate at a faster rate than the drive shaft 26 due to the larger diameter of the first drive gear 38 relative to the first driven gear 40.

The second gear pair 36 of the plurality of gear pairs provides means to effectively "recapture" what may be referred as lost energy. Typically, when an operator has reached a certain momentum or speed, a certain amount of "coasting" occurs wherein the operator does not pedal forwardly with his feet but merely holds his feet in a stationary position allowing the bicycle-type vehicle 12 to travel forwardly. When this happens, a second drive gear 48 is connected to the driven axle 30 so as to rotate therewith. This forward direction of rotation will cause the forward rotation of the second driven gear 50 attached to the drive shaft 26 by an independent ratchet structure 52 to cause or at least maintain a forward direction of rotation of the drive shaft 26. Obviously, the second drive gear 48 and second driven gear 50 are interconnected by the interconnecting member or sprocket chain 54. Due to the differences in sizes of the second drive and driven gears 48 and 50 respectively, a certain amount of pulling force will be transferred to the drive shaft 26 facilitating again the forward rotation thereof and accordingly the forward rotation of the first drive gear 38 in accordance with the directional arrow 42. This in turn will be transferred back to a positive forced rotation of the driven axle 30 due to the driving interconnection between the first drive gear 38 and the first driven gear 40.

The first driven gear 40 and the second driven gear 50 are preferably of the same size and both being smaller than the first drive gear 38. In addition, the second drive gear 48 is larger than the first driven gear 40 and the second driven gear 50, but somewhat smaller than the first drive gear 38. The obvious mechanical advantage is present as set forth above. Again, due to the interconnecting ratchet structure 44 serving to mount the first drive gear 38 on the drive shaft 26, the first drive gear 38 will be allowed to free-wheel until a positive forward rotational motion is applied to the drive shaft 26 by the forced rotation of the second driven shaft 50.

In one embodiment of the present invention, the plurality of gear pairs further includes a third gear pair 58 including a third drive gear 60 and a third driven gear 62 drivingly connected to one another by interconnecting member 63 in the form of a sprocket gear. The third drive gear 60 is interconnected to the drive shaft 26 by an independent ratchet structure 65 so as to rotate positively therewith when the drive shaft travels in a direction indicated by the solid directional arrow 63. However, the ratchet 65 is further structured to allow free-wheeling of the drive gear 60 when the drive shaft rotates in a direction indicated by the phantom directional arrow 64. Accordingly, when the operator pedals in a reverse direction or in a direction indicated by the directional arrow 63, a breaking action will occur since the interconnecting member 63 will attempt to force the drive axle 30 to rotate in a reverse direction than that indicated by the solid directional arrow 42 of the first drive gear 38. Also, in a preferred embodiment, a first and third drive gears 38 and 60 are the same size and larger, preferably in a ratio of at least two to one, than the first and third driven gears 40 and 62 respectively.

The plurality of gears of the subject drive assembly 10 further comprises a fourth gear pair 66 including a fourth drive gear 67 and a fourth driven gear 68 both of substantially the same size or diameter and being interconnected by an interconnecting member in the form of a sprocket gear 69. The first drive gear 67 is connected to rotate with the drive shaft 26 by an independent sprocket 69 so as to be positively driven in a forward direction and free-wheeling in a reverse direction. The fourth driven gear 68 is connected to rotate with the driven axle 30 in either direction. Due to the one to one gear ratio between the drive gear 67 and the driven gear 68 maintenance of the transfer of energy to the drive shaft 26 from the driven axle 30 during a coasting mode or operation of the vehicle is maintained as the vehicle begins to slow and lose momentum. Accordingly, the amount of "lost energy" transferred during the coasting mode is maximized in the transfer of energy from the driven axle 30 to the drive shaft 26, upon continued rotation of the drive wheel 18 during coasting of the vehicle 12.

Now that the invention has been described,

What is claimed is:

1. A drive assembly for a bicycle or like vehicle primarily of the type which is powered manually by an operator, said drive assembly comprising:

(a) a drive shaft and a driven axle each mounted on a frame of the vehicle in spaced relation to one another, (b) operator activating means connected to said drive shaft and disposed and structured for engagement by the operator and rotation of the drive shaft, said driven axle connected to a power take-off of the vehicle, (c) a gear assembly comprising a plurality of gear pairs, each including a drive gear and a driven gear connected to one another by an interconnecting member and mounted on a different one of said drive shaft and driven axle to rotate therewith, (d) said plurality of gear pairs comprising a first gear pair including a first drive gear and a first driven gear, said first drive gear drivingly connected to said first driven gear and having a greater diameter than said first driven gear, (e) said plurality of gear pairs further comprising at least a second gear pair comprising an interconnected second drive gear and second driven gear, (f) said second drive gear having a larger diameter than said second driven gear and each respectively mounted on said driven axle and said drive shaft, and (g) said first drive gear and second driven gear mounted on said drive shaft by independent ratchet means structured to rotate with said drive shaft during a forward direction of rotation thereof.

2. An assembly as in claim 1 wherein said plurality of gear pairs further comprises a third gear pair including a third drive gear connected to and rotatable with said drive shaft and a third driven gear connected to and rotatable with said driven axle; ratchet means interconnecting said third drive gear to said drive shaft and structured for rotation therewith when said drive shaft rotates in a reverse direction and to allow free-wheeling relative to said drive shaft when rotating in a forward direction.

3. An assembly as in claim 2 wherein said third drive gear is larger than said third driven gear.

4. An assembly as in claim 3 wherein said first and third drive gears are substantially equal in size and said first and third driven gears are of substantially the same size and smaller than said first and third drive gears.

5. An assembly as in claim 4 wherein said first and said second drive gears are of substantially equal size and of at least twice the respective size of said first and second driven gears.

6. An assembly as in claim 5 wherein said operator activating means comprises a foot pedal means connected to opposite ends of said drive shaft for forced rotation thereof in at at least one direction.

7. An assembly as in claim 6 wherein said operator activating means further comprises ratchet means mounted on opposite ends of said drive axle and structured to rotate said drive axle in at least said one direction upon forced rotation of said foot pedal means.

8. An assembly as in claim 7 further comprising bearing means mounted on said drive axle between said opposite ends thereof and secured to the frame of the vehicle and rotatably interconnecting said drive shaft to said frame.

9. An assembly as in claim 1 wherein said first and second drive gears are larger than said first and second driven gears and said first and second driven gears are substantially equal in size.

10. An assembly as in claim 9 wherein said third drive gear is of substantially the same size as said first and said second driven gears.

11. An assembly as in claim 1 wherein said plurality of gear pairs further comprises a fourth gear pair comprising a fourth driven gear mounted on said driven axle and a fourth drive gear mounted on said drive shaft.

12. An assembly as in claim 11 wherein both said fourth drive gear and said fourth driven gear are interconnected to said drive shaft and said driven axle respectively by ratchet means, said ratchet means structured for positive rotation of said respective gears relative to the shaft and axle on which they are mounted in at least one direction.

13. An assembly as in claim 1 wherein said fourth drive gear and said fourth driven gear are of substantially equal size and both being larger than said first, said second and said third driven gear and smaller than said first, said second and said third drive gears.

* * * * *